March 22, 1966 F. N. PIASECKI 3,241,791
COMPOUND HELICOPTER WITH SHROUDED TAIL PROPELLER
Filed April 3, 1964 3 Sheets-Sheet 1

INVENTOR
FRANK N. PIASECKI
BY Mason, Fenwick & Lawrence
ATTORNEYS

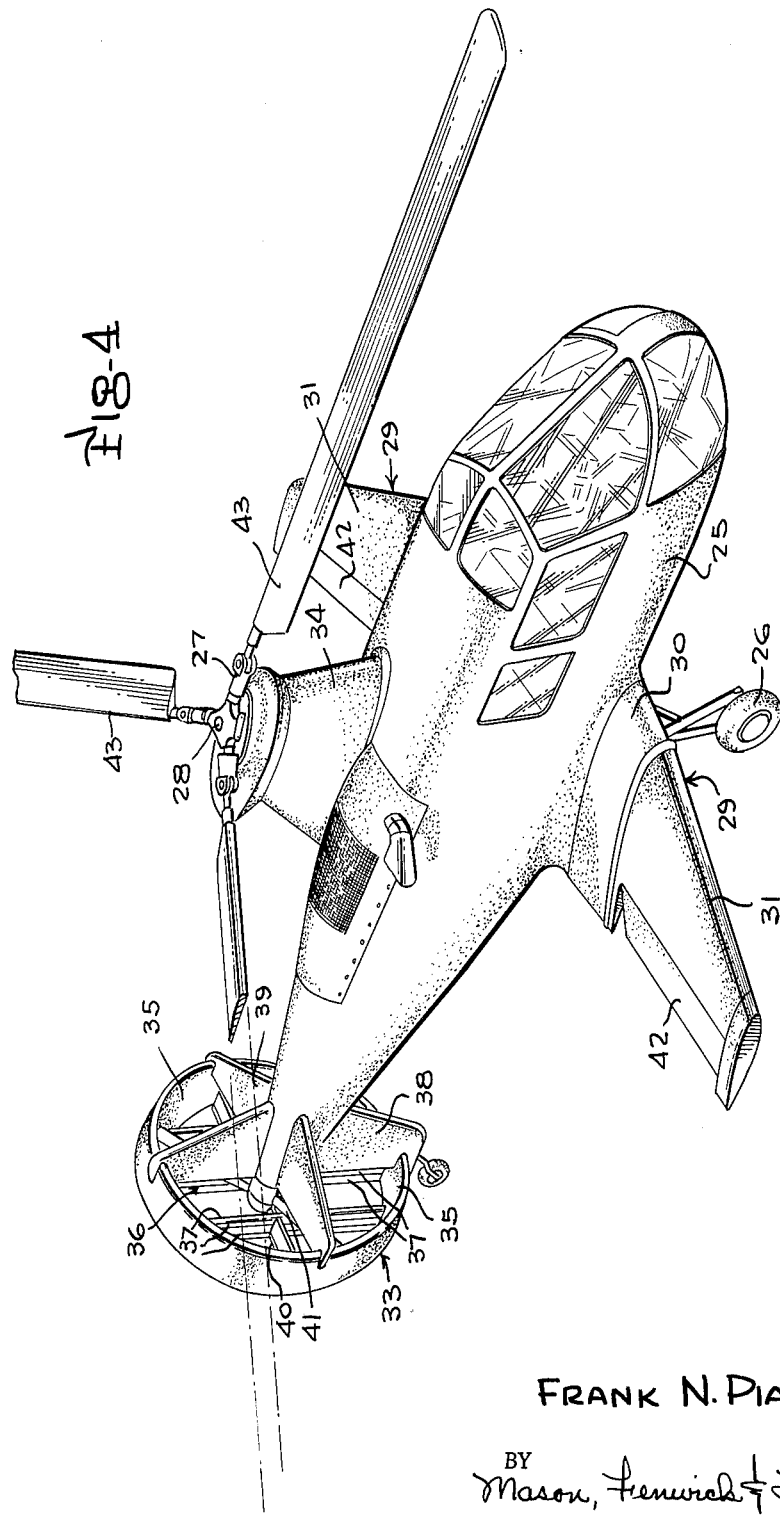

March 22, 1966 F. N. PIASECKI 3,241,791
COMPOUND HELICOPTER WITH SHROUDED TAIL PROPELLER
Filed April 3, 1964 3 Sheets-Sheet 3
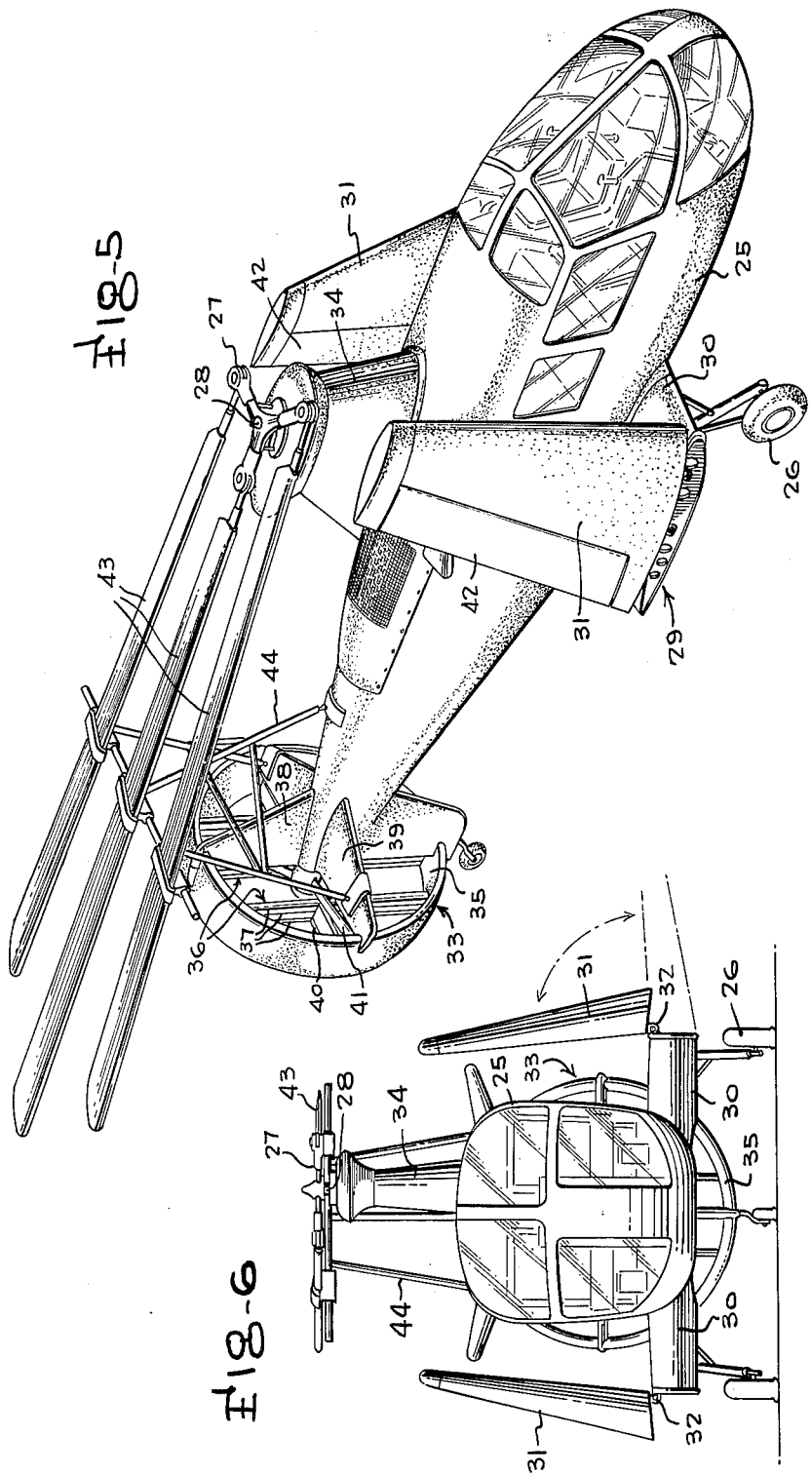

United States Patent Office 3,241,791
Patented Mar. 22, 1966

3,241,791
COMPOUND HELICOPTER WITH SHROUDED TAIL PROPELLER
Frank N. Piasecki, Tunbridge Road at Andover Road, Haverford, Pa.
Filed Apr. 3, 1964, Ser. No. 357,197
1 Claim. (Cl. 244—17.19)

This invention relates generally to rotary wing aircraft, and more particularly to helicopters of the shaft-driven, single rotor type having improved means for torque correction, and is a continuation-in-part of copending application Serial No. 166,292, filed January 15, 1962, now Patent No. 3,138,349.

It has been almost universal to correct for torque developed by the overhead rotor of a single rotor helicopter by use of the so-called tail rotor. This consists of a small propeller mounted upon a shaft lying transversely of the aircraft and located at the end of a boom projecting rearwardly from the fuselage. The propeller develops a lateral thrust and the boom serves as a lever arm, so that relatively small thrust by the tail rotor is usually sufficient to counteract the torque developed by the overhead revolving main rotor.

There are a number of recognized disadvantages to tail rotor systems, however, and among these are: (1) Decrease in performance because of power necessary to drive the tail rotor; (2) An ever present hazard to ground personnel due to exposed position of tail rotor; (3) Complete loss of machine due to minor loss of tail rotor brought about by hitting brush or other object on landing, thus causing the machine to spin and capsize; (4) High frequency vibrations induced into the machine by the tail rotor and the boom; and (5) High maintenance costs on the tail assembly.

The general object of the present invention is to provide torque correction means which will eliminate most, if not all, of the above-noted objections to use of the conventional tail rotor.

A more specific object is to provide improved torque control means which will incorporate forward propulsion means so that torque control, forward propulsion, or a combination of the two effects can be produced.

Another object is the provision of torque control means wherein the thrust-developing member is housed to protect personnel from accidental contact with it, and the housing is utilized to increase the thrust which is developed by the member.

A further object of the invention is to provide a helicopter tail assembly having means to develop a forward thrust of the machine and means to form a reaction surface of the thrust to determine its effective direction, and controls for that assembly to regulate the respective means in accordance with a selected regime.

Yet another object is to provide a compound helicopter with an improved tail assembly which has means to develop a forward thrust which can be utilized for forward propulsion of the aircraft in propeller driven flight or to impinge upon angularly disposed vanes to serve as torque control means.

Still a further object of the invention is to provide a compound helicopter having novel features to improve the general flying ability, speed, maneuverability and overall stability of the aircraft.

Other objects of the invention will become apparent from the following description of practical embodiments thereof, when taken in conjunction with the drawings which accompany, and form part of, this specification.

In the drawings:

FIGURE 4 is a perspective view of the aircraft showing some of the structural features in more detail;

FIGURE 5 is another perspective view illustrating the aircraft with wings folded and rotor blades in folded and stowed position; and FIGURE 6 is a front elevation of the aircraft, as shown in FIGURE 5;

Figure 2:
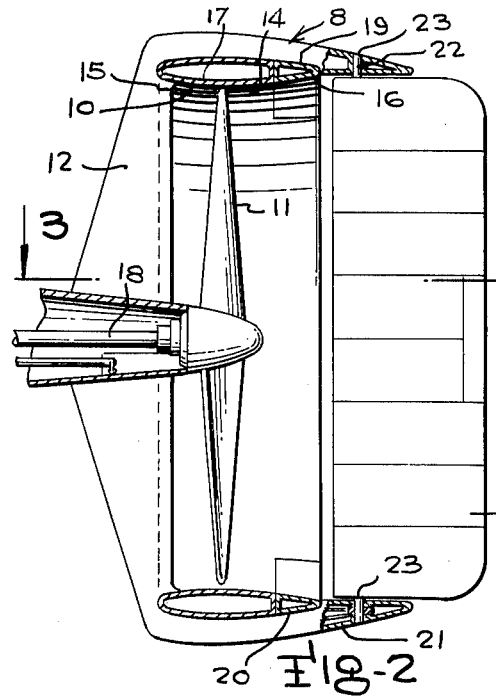
FIGURE 2 is a central, vertical, longitudinal section, on an enlarged scale, taken through the tail assembly of the helicopter shown in FIGURE 1.
Figure 3:
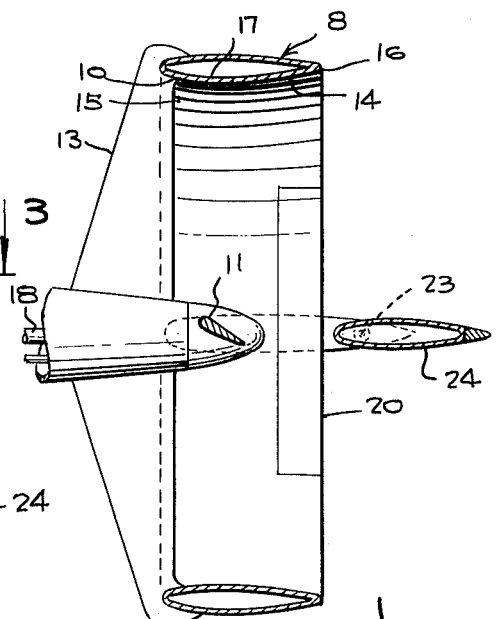
FIGURE 3 is a horizontal section taken on the line 3—3 of FIGURE 2.

In general, the present invention is concerned with providing single rotor helicopters with an improved tail structure to provide for rotor torque correction and for forward propulsion. The improved tail includes a propeller and a shroud therefor, having coincident axes arranged longitudinally of the aircraft, with vanes movable in the propeller slipstream to provide reaction surfaces to control the effective direction of the propeller thrust.

Referring to the drawings in detail, there is shown, somewhat conventionally, a helicopter 1 having a fuselage 2, suitable landing gear 3, and a single rotor assembly 4 mounted upon a vertical shaft 5 above the fuselage. The rotor will be driven from the usual engine 6, shown in dotted lines, and will have standard controls (not shown). The machine shown includes short wings 7. A tail assembly 8 is carried at the rear of the fuselage, and controlled by a manual control system 9.

The helicopter illustrated is merely an example of one type of machine with which the invention may be used. It is to be understood that any single rotor type helicopter can be provided with the tail assembly and controls of the present invention.

The tail assembly 8 includes a circular shroud 10 in which a propeller 11 is mounted. The shroud is attached to the fuselage end through vertical and horizontal stabilizers 12 and 13, which are connected to the shroud at the ends of the vertical and horizontal diameters of the shroud, and to the fuselage at their region of intersection at the central axis of the shroud. The stabilizers may take any convenient shape, and will be rigid and immovable.

The shroud may have an airfoil cross-section, thus providing a fore and aft curvature both outside and inside the shroud. The inner surface 14, which defines the duct through which the air column for propeller 11 is drawn, will have its inlet end 15 and usually its outlet end 16 of larger cross-sectional area than the mid-section 17. Usually, the propeller will be mounted in the plane of smallest cross-section, and the propeller length will be such that in rotation the propeller will approximately cover the entire area of the inner opening of the shroud in the plane of rotation of the propeller. This arrangement will affect the propeller action in two ways, both of which will result in increased thrust for a propeller of given diameter, pitch and speed. The first effect is to prevent the slipstream from the propeller from contracting downstream to one-half the propeller diameter as it would do in the case of a free propeller. The second is the confining of the column against lateral escape so that there will be no tip losses and the thrust of the full blade length will be effective. By reason of this, smaller propellers and less engine power will be required to provide the desired force.

The propeller 11 is of the adjustable pitch type and may be mounted upon a shaft 18, driven by the engine 6, or if desired, a separate engine may be provided for the propeller.

Trim tabs 19 and 20 are provided at the top and bottom trailing edge of the shroud to control pitch of the aircraft.

Vane brackets 21 project from the rear of the shroud at top and bottom, to carry bearings 22 for pivot trunnions 23 of a rudder 24. The rudder is the full height of the shroud, and is pivoted intermediate its front and back ends to provide maximum rudder area at the center portion of the propeller slipstream when the rudder is deflected from a true fore and aft position.

The tail as just described may be used to counteract the torque of the rotary wing to hold the fuselage against spinning, and to control the movement of the machine in yaw, and also as a means for forward propulsion of the helicopter. When hovering, the rudder may be turned sharply, approximately 70°, in the direction of rotor torque, so that the slipstream from propeller 11 will impinge upon it and create a lateral counter-thrust to offset the rotor torque. With the rudder in set position, the lateral thrust can be increased or decreased to control the fuselage position by changing the propeller pitch, or speed, or both. When it is desired to propel the machine at high forward speed, the rudder will be moved to a more nearly fore and aft position and the propeller thrust will be forwardly to move the machine forwardly. During this movement, the helicopter rotor 4 may be in autorotation, and the rotor and wings 7 will each provide a portion of the lift required to keep the machine in level flight. Under these conditions, pitch of the machine is controlled by the tabs 19 ond 20, and the aircraft is controlled in yaw by movement of the rudder 24.

From the above it will be clear that when the helicopter is hovering, the rudder, or vane, setting will be varied little, while changes in propeller pitch will be the controlling factor. When in high speed, forward flight, however, the propeller pitch remains substantially constant, while the rudder is moved to control machine direction. It is desirable, therefore, that a single control mechanism be provided which can be set for either hovering or forward flight and, when so set, will provide control of the propeller pitch and rudder position in accordance with requirements in the condition selected. One such control mechanism is shown in the above mentioned copending application Serial No. 116,292, now Patent No. 3,138,349.

Figure 1:
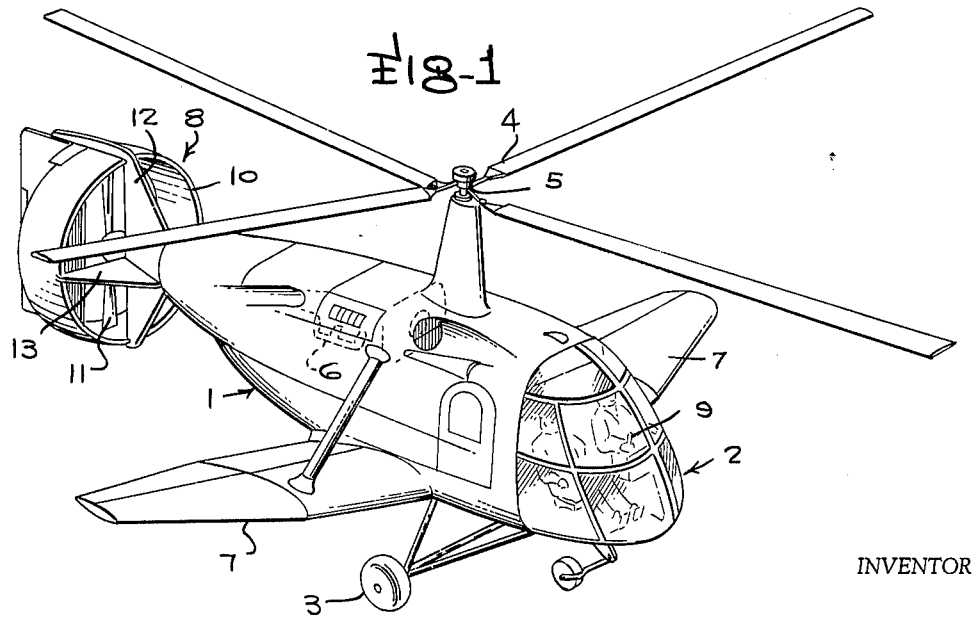
FIGURE 1 is a perspective view of a helicopter having the improved tail assembly and controls therefor contemplated by the present invention.

Referring now to FIGURES 4, 5 and 6, the helicopter shown in FIGURE 1 is shown in greater detail with some added structural features. The helicopter is the compound type, having a fuselage 25 with landing wheels 26, a rotor assembly 27 mounted on a shaft 28 and driven by an engine (not shown) within the fuselage. Wings 29 have their root sections 30 fixed to the fuselage, and tip panels 31 hinged to the root sections by suitable hinges 32. At the rear of the fuselage, there is a tail assembly 33.

It will be noted from FIGURES 4, 5 and 6, that the rotor shaft is enclosed in a pedestal-type housing 34, and the entire assembly is offset laterally of the centerline of the aircraft. This is done to counteract the tendency of the aircraft to rotate about its central, longitudinal axis due to the different height levels of the rotor assembly and torque control elements. This greatly improves the handling of the aircraft and practically eliminates the need to control the tendency to roll when hovering.

The tail assembly 33 is similar to that shown in co-pending application Serial No. 305,269, filed August 29, 1963, in that it consists in a fixed annular shroud 35 in which are mounted a plurality of vertical vanes 36, each composed of a plurality of vertical hinged sections 37. These are controlled simultaneously, by means of linkages similar to that disclosed in application Serial No. 305,269. The shroud is mounted at the tail end of the fuselage by means of vertical and horizontal members 38 and 39 which not only support the annulus, but serve as vertical and horizontal stabilizers as well. At the rear of the annulus, there is a trim tab 40 hinged for vertical movement to control longitudinal pitch, or altitude. A pusher type propeller 41 is mounted coaxially of the shroud and preferably at the smallest diameter of the interior duct of the shroud.

Wings 29 are provided with control flaps 42 which form the trailing edges of wing tip sections 31. These elements are movable vertically simultaneously about their hinged connections with the wings, to provide additional lift, and for braking effect, as in conventional winged aircraft. They are also operable in opposite phase in the manner of ailerons for trim and roll control.

The compound helicopter disclosed herein has many advantages over the conventional helicopter. The basic principle in compound helicopter design is to unload the lift and propulsion functions of the rotor onto a wing and propeller, respectively, as the aircraft increases forward speed. With the present aircraft, forward propusion and control means and torque control are combined in a single assembly at the tail. In addition, flight controls are provided for forward flight to provide pitch, yaw and roll control similar to that of conventional winged aircraft. In other words, the present aircraft is capable of hovering as a normal helicopter, or take-off, straight away flight and landing as a fixed-wing craft.

When the aircraft is in the hover, or slow flight, condition, the main rotor is the primary source of lift, while the ducted propeller 41 has its thrust imposed upon the inclined vanes 36 of the tail assembly to provide directional control and counter the torque effect of the main rotor. In this condition, the trim tab 40, being in the airstream of the ducted propeller, can be used to control the longitudinal attitude of the craft and trim for various center of gravity positions. This helicopter can effect a smooth transition from hover to high speed flight. The tail assembly vanes are moved to a low camber position and the pitch of the propeller 41 is set for cruise condition. At the same time, the main rotor is slowed to transfer the lift from the rotor to the wings and pusher propeller. The rotor will turn at just enough speed during forward flight, that high speeds may be attained, and complete control may be had through the use of the wing flaps 42, trim tab 40 and the vertical vanes 36 of the tail assembly.

As mentioned above, the wings 29 are foldable. This permits storage in smaller areas. To the same end, the main rotor blades 43 may be folded to overlie the fuselage for storage purposes. A suitable rack 44 may be used to support the free ends of the blades when folded.

While in the above practical embodiments of the invention have been disclosed, it will be understood that the specific details of construction shown and described are merely by way of illustration, and the invention may take other forms within the scope of the appended claim.

What is claimed is:

In rotary wing aircraft of the type having a fuselage and a shaft driven single rotor mounted over the fuselage, means to correct for rotor torque comprising, a propeller mounted at the tail of the fuselage for rotation about an axis extending longitudinally of the aircraft, means to drive the propeller, a shroud encircling the propeller and defining a longitudinally extending air duct in which the propeller rotates and which is concentric with the propeller axis, the encircling shroud having an air foil cross-section whereby the air duct has an inlet end adjacent the fuselage and outlet end at the back of the shroud of larger diameter than the mid-section, the propeller being mounted for rotation at substantially the air duct mid-section and substantially spanning the duct mid-section, a vertical rudder at the air duct outlet end spanning the outlet and pivotally mounted to the shroud for swinging movement about a vertical axis fer deflection in the propeller slipstream, fixed vertical and horizontal stabilizers at the inlet end of the shroud, and vertically tiltable trim tabs on the shroud at the outlet end to control pitch movement of the aircraft.

References Cited by the Examiner

UNITED STATES PATENTS

| | | | |
|---|---|---|---|
| 2,419,780 | 4/1947 | Jordan | 244—7 X |
| 2,547,255 | 4/1951 | Bruel | 244—17.19 |
| 3,061,242 | 10/1962 | Zurawinski | 244—23 |

FOREIGN PATENTS

| | | |
|---|---|---|
| 570,455 | 7/1945 | Great Britain. |
| 755,629 | 8/1956 | Great Britain. |
| 328,320 | 8/1935 | Italy. |

MILTON BUCHLER, *Primary Examiner.*

FERGUS S. MIDDLETON, *Examiner.*

G. P. EDGELL, L. C. HALL, *Assistant Examiners.*